United States Patent
Winslow

[15] 3,660,757
[45] May 2, 1972

[54] FLASH TUBE POTENTIAL INDICATOR

[72] Inventor: Willis M. Winslow, Wheatridge, Colo.
[73] Assignee: Wefco, Inc., Wheatridge, Colo.
[22] Filed: Feb. 2, 1970
[21] Appl. No.: 7,605

[52] U.S. Cl. ............................................. 324/122, 324/133
[51] Int. Cl. ........................................ G01r 13/36, G01r 19/16
[58] Field of Search ................. 324/133, 126, 119, 111, 72.5, 324/122; 317/258

[56] References Cited

UNITED STATES PATENTS

| | | | |
|---|---|---|---|
| 3,265,969 | 8/1966 | Catu | 324/122 X |
| 3,392,334 | 7/1968 | Bevins | 324/72.5 X |
| 3,524,133 | 8/1970 | Arndt | 324/133 X |
| 3,340,074 | 9/1967 | Herczog | 317/258 X |

Primary Examiner—Alfred E. Smith
Attorney—Sheridan, Ross & Burton

[57] ABSTRACT

This disclosure describes a flash tube potential indicator that indicates whether or not a high voltage line is energized. Rectifiers convert a.c. microamps to direct current to charge capacitors. When the capacitors reach a predetermined voltage level, they are discharged through a photoflash tube. The resultant flash indicates the existence of a high voltage on the high voltage line. The various electric circuit components are mounted in a tubular structure which may or may not be directly attached via a suitable clamp to a high voltage line. In addition, to increase the safety of the invention, barium titanate rods capacitively couple the rectifiers to the high voltage line.

10 Claims, 4 Drawing Figures

INVENTOR
WILLIS M. WINSLOW

INVENTOR
WILLIS M. WINSLOW

BY Sheridan, Ross and Burton
ATTORNEYS

FLASH TUBE POTENTIAL INDICATOR

BACKGROUND OF THE INVENTION

This invention is directed to potential indicators and more particularly to flash tube potential indicators for indicating whether or not a high voltage line is energized.

For safety reasons, it is of utmost importance for electric power companies to know whether or not their high voltage lines are energized. That is, a transmission line repairman will work on an unenergized high voltage line in a different manner than he will work on an energized high voltage line. Knowing whether or not high voltage lines are energized is also important to an electric power company when attempting to determine the location of a fault.

Various types of high voltage potential indicators have been proposed and are in use. However, they all have disadvantages. In many cases, prior art high voltage potential indicators use batteries, resulting in an unuseful device each time the battery goes dead. Others use various inductive coupling arrangements mounted so as to sense the flow of current through a line and utilize the sensed current to operate an indicator. These devices are overly complicated and, therefore, also unsatisfactory for that reason.

Therefore, it is an object of this invention to provide a new and improved potential indicator.

It is a further object of this invention to provide a new and improved potential indicator suitable for use with high voltage lines to determine whether or not a high voltage line is energized.

It will also be appreciated by those skilled in the art that it is desirable to have a high voltage indicator that can be either hand held or fixedly attached to a high voltage line. Therefore, it is also an object of this invention to provide a high voltage line potential indicator that is versitile in the sense that it can be either hand held and manually brought into contact with a high voltage line or fixedly attached to a high voltage line and does not require a further connection to ground.

It is further object of this invention to provide a potential indicator for indicating whether or not a high voltage line is energized that can be fixedly attached to a high voltage line while providing an indication that is viewable from a distance.

SUMMARY OF THE INVENTION

In accordance with a principle of this invention a flash potential indicator that indicates whether or not a high voltage line is energized is provided. The invention includes rectifiers to convert a.c. microamps to direct current and utilizes the direct current to charge capacitors. When the charge on the capacitors reaches a predetermined voltage level, they are discharged through a photoflash tube. The resultant flash indicates the existence of a high voltage. The various electrical components making up the invention are mounted in a tubular structure which may or may not be directly attached by a suitable clamp to a high voltage line. To increase the safety of the invention, barium titanate rods capacitively couple the recitifiers to the high voltage line.

In accordance with a further principle of this invention a glow lamp is connected to the chargeable capacitors and to a suitable solid state switch. When the glow lamp becomes conductive the solid state switch is triggered. Triggering of the solid state switch applies a suitable induced voltage to the photoflash tube, causing it to flash.

It will be appreciated from the foregoing summary of the invention that a high voltage flash tube potential indicator is provided. Because the invention does not use batteries, it eliminates the dead battery problem of systems which do use batteries. Further, the invention is safe because it uses rods of barium titanate as coupling capacitors. It will be appreciated that barium titanate is a ceramic like material which will not burn and is less likely to breakdown than many other coupling capacitive materials. Moreover, because the system utilizes a flash tube, it can be permanently attached to a high voltage line and still be viewed at relatively great distances.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
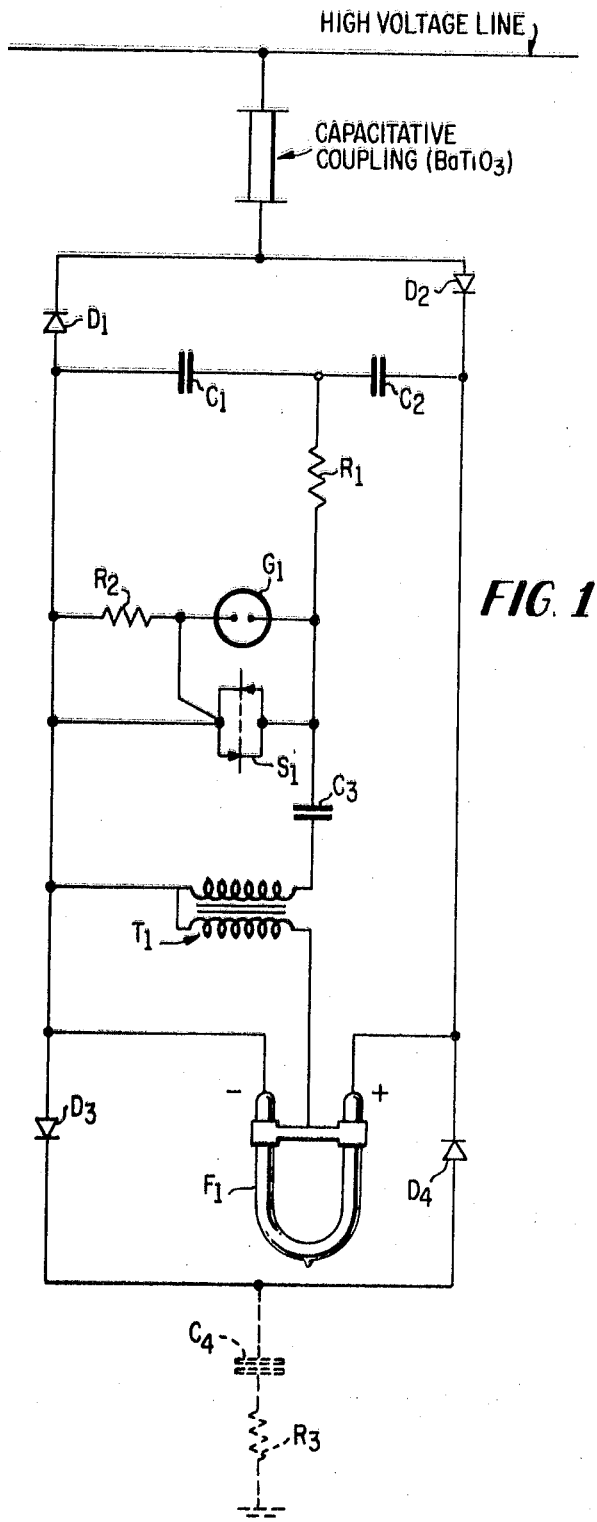
FIG. 1 is a schematic diagram of the electrical elements forming a preferred embodiment of the invention.

FIG. 1 is a schematic diagram of a preferred embodiment of the electrical elements of the invention and comprises: four diodes designated D1, D2, D3 and D4; four capacitors designated C1, C2, C3 and C4; three resistors designated R1, R2 and R3; a glow lamp designated G1; a triac or solid state switch designated S1; a transformer designated T1; and, a flash tube designated F1. C4 and R3 are dotted to designate an impedance coupling between the herein described structure and ground. This impedance coupling is the impedance of the supporting structure. In addition, it includes the impedance of the human body if an operator is manually using the invention.

Figure 2:
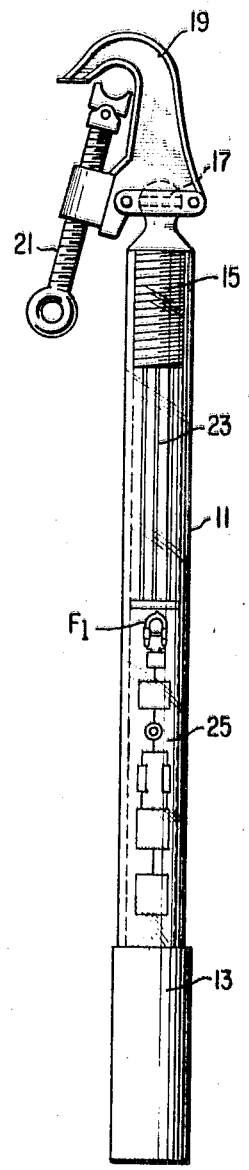
FIG. 2 is a view of a structure formed in accordance with the invention for supporting the electrical elements illustrated in FIG. 1.

Also illustrated in FIG. 1 is a capacitive coupling means adapted to couple a high voltage line to the electronics system therein illustrated. The capacitive coupling is formed of barium titanate ($BaTiO_3$). Preferably, as illustrated in FIG. 2, the barium titanate is formed in rods cast in epoxy. It will be appreciated by those skilled in the art that barium titanate is utilized as part of the invention because it will not burn, is less likely to break down, has a very high capacitive coupling characteristic and provides a reliable and safe circuit when used in the environment of intended use of the invention.

For example, a rod of barium titanate as contemplated herein has a dielectric constant $k$ of approximately 5,000. Since a preferred length of such a rod is about 6 inches long, it will be appreciated that arcing between the ends of the rod will not readily occur. An equivalent capacitor using air as a dielectric rather than barium titanate would have plates separated by a distance of approximately 0.001 inches. It will be obvious to those skilled in the art that arcing will readily occur between plates separated by such a distance.

One end of the barium titanate rods is in contact with the high voltage line and the other end is connected to the cathode of D1 and the anode of D2. The anode of D1 is connected through C1 in series with C2 to the cathode of D2. The junction between C1 and C2 is connected through R1 to one side of G1 and one power terminal of S1. The other end of G1 is connected through R2 to the junction between D1 and C1. The junction between G1 and R2 is connected to the gate of S1. The other power terminal of S1 is connected to the junction between D1 and C1.

The other end of R1 is also connected through C3 to one end of the primary winding of T1. The other end of the primary winding of T1 is connected to one end of the secondary winding of T1 and to the junction between D1 and C1. The terminals of F1 are connected to the junction between D1 and C1 and to the junction between D2 and C2. The other side of the secondary winding of T1 is connected to a metal band on the outside of F1. The junction between D1 and C1 is also connected to the anode of D3. The cathode of D3 is connected to the anode of D4 and, the cathode of D4 is connected to the junction between D2 and C2. The junction between D3 and D4 is connected through C4 and R3 to ground.

In operation, the diodes D1, D2, D3 and D4 form a bridge circuit which charges C1 and C2 from the high voltage line source after passing through the capacitive coupling provided by the barium titanate. In other words, the solid state rectifiers convert a.c. microamps into direct current to charge C1 and C2. This bridge arrangement used to form stored energy makes possible the operation of this invention from very low values of current supply. In other words, while the current drawn from the high voltage line is very minimal, the potential stored provides sufficient energy to operate the photoflash tube in the manner herein described.

C1 and C2 are automatically discharged through F1 at a predetermined voltage level. More specifically, G1 triggers or becomes conductive when the voltage at the junction between C1 and C2 reaches a predetermined level. The resulting voltage across R2 causes S1 to become conductive. Conduction of S1 causes C3 to discharge through the primary winding of T1. This discharge induces a relatively high voltage in the secondary winding of T1. The high voltage pulse in the secondary winding of T1 is applied to the metal band of F1 to ionize the gas inside of the flash tube, thereby initiating a conductive flash as C1 and C2 discharge.

FIG. 2 illustrates a structure for housing the electrical components illustrated in FIG. 1 and a means for attaching the components to a high voltage line. More specifically, FIG. 2 comprises a clear plastic tube 11 having a metal handle 13 attached to one end and a metallic tip 15 including a ball shaped outer end 17 attached to the other end. A removable conventional line clamp 19 is illustrated as attached to the ball 17. The line clamp 19 is generally hook-shaped and includes a screw-type member 21 for fixedly attaching the line clamp 19 to a transmission line or one of the insulators of a transmission line.

Barium titanate rods 23 cast in epoxy are in electrical contact with the metallic tip 15 at its inner end. The barium titanate rods extend inwardly toward a circuit board 25. The circuit board has mounted thereon the various components illustrated in FIG. 1 including the flash tube F1. It will be appreciated that because the tube 11 is formed of clear plastic, the flashes of F1 are visible through the side of the tube. The other end of the circuit board is adjacent the metallic handle 13. More specifically, the metallic handle 13 is connected to the junction between D3 and D4 (FIG. 1). In addition, the inner end of the barium titanate rods are connected to the junction between D1 and D2.

It will be appreciated from the foregoing description that the invention provides a battery-less device that will indicate whether or not a high voltage line is energized. Because a line clamp is used, the inventive indicator can hang on a high voltage line with no other electrical connection and give off a repeating flash of light visible from a distance. Further, because a very high impedance coupling means the (barium titanate rods), is provided, the device is safe for hand use. Yet, the same coupling means has little effect when the indicator is permanently attached to a high voltage line.

While the use of barium titanate is preferred, other methods of safe coupling can be used by the invention. For example, a neon tube connected in series as part of the test indicator with the insulation of a plastic handle and glass tube along with the current limiting characteristics of the glass tube will provide a safe amount of insulation, yet allow coupling. The relatively faint red glow of the neon tube in the presence of an electric field also provides an alternate or additional means of potential indication.

Figure 3:
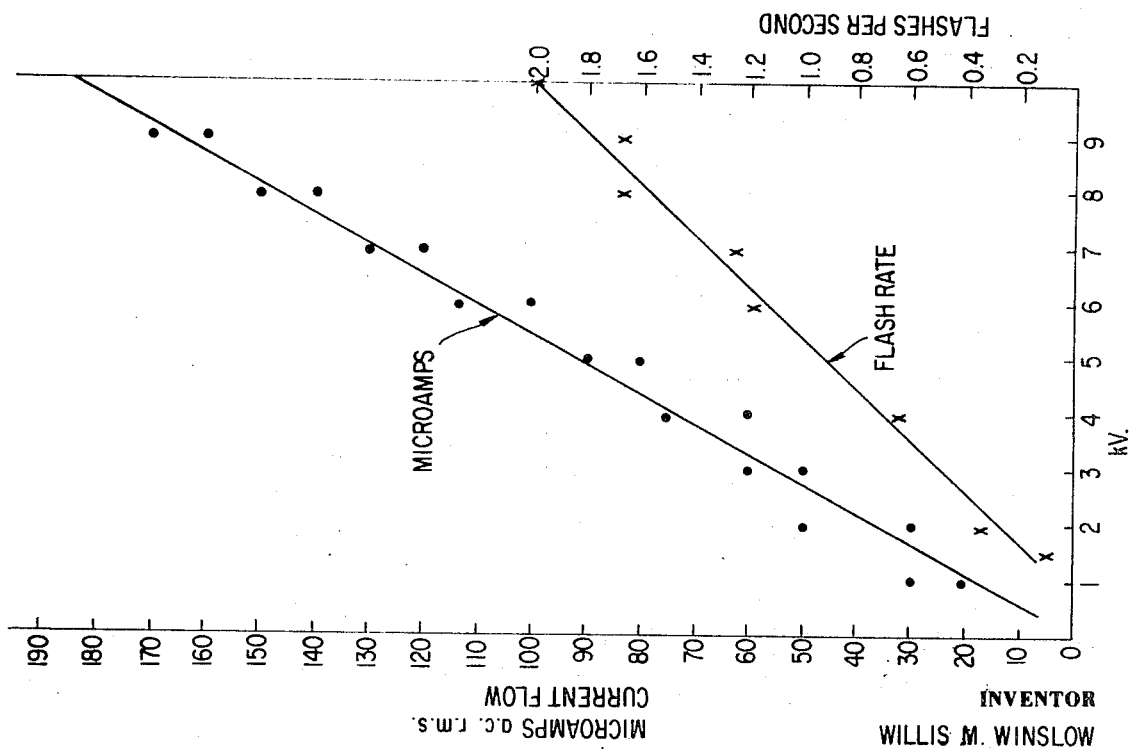
FIG. 3 is a graph illustrating the linear behavior between current flow and rate of flash with respect to voltage; and, FIG. 4 is a graph illustrating the optimum value of capacitors designed to maintain minimum flashing times for various watt second flashes.

FIG. 3 is a graph taken from tests made of one embodiment of the invention which shows a linear behavior between the rate of current flow and the rate of flash with respect to voltage. The graph indicates that the capacitors are charged at the same rate as if they were connected to a direct current voltage in series with a high value of current limiting resistance.

Because of the foregoing relationship, the following theoretical description of the invention utilizes a direct current equivalent. More specifically, the invention can be visualized as a simple circuit comprising a series connected capacitor and resistor. This circuit has a voltage drop across it that can be expressed mathematically by the following differential equation:

$$E = Ri + \frac{Q}{c} = R\frac{dQ}{dt} + \frac{Q}{c} \quad (1)$$

where:
$E$ = applied line potential in volts;
$Q$ = quantity of charge on capacitor in coulombs;
$c$ = capacitor size in farads; and,
$R$ = series resistance in ohms
From which it can be shown that:

$$Q = Ec(1 - e^{-t/Rc}) \quad (2)$$

Using test values in the foregoing equation of: $E = 10,000$ volts, $R = 50$ megohms, $C = 0.088$ microfarad, and $t = \frac{1}{2}$ second, results in a $Q$ of 0.00090 coulombs. The corresponding voltage across the capacitors can be calculated from $N = Q/c$ or 1,020 volts. This voltage divides across the series-parallel connected capacitors in proportion to their sizes resulting in 127 volts being applied to the control circuit of the flasher for C1 =0.5 microfarads and C2 =0.1 microfarads.

Also of importance is the watt-second energy value associated with the capacitor charge, which value can be calculated from the following equation:

$$VQ = cE^2(1 - e^{-t/Rc})^2 \quad (3)$$

If it is assumed that a certain brilliance of flash is sufficient, the watt-second value may be held constant and the flash time, $t$, may be studied with respect to capacitor size, $c$.

Algebraic manipulation of the watt-second relationship results in the following equation:

$$t = Rc \log \frac{1}{1 - \frac{1}{E}\sqrt{\frac{VQ}{c}}} \quad (4)$$

Figure 4:
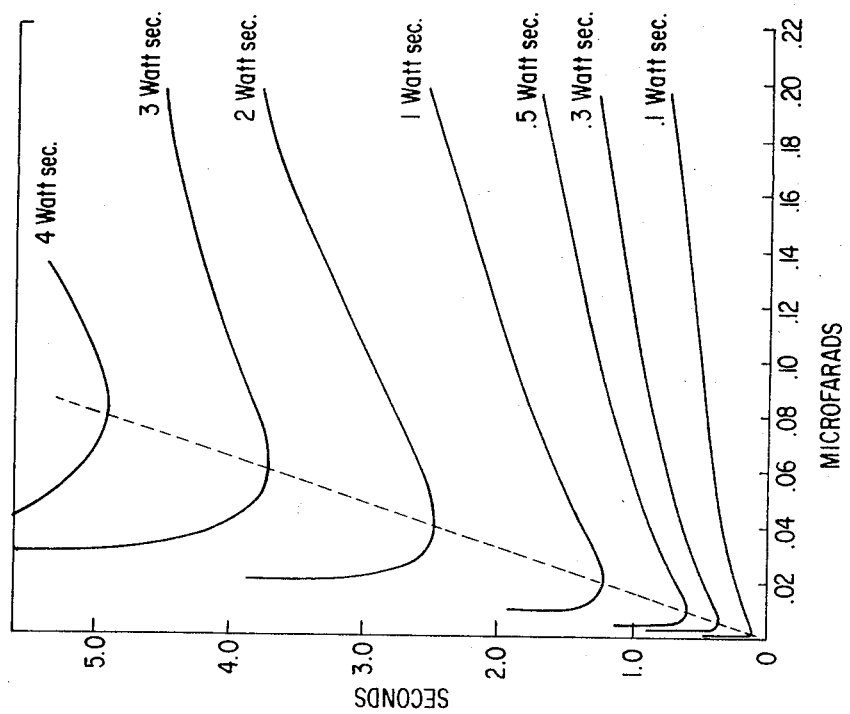

The graph illustrated in FIG. 4 clearly shows the optimum values of capacitance necessary to maintain minimum flashing times. It will be appreciated that a design based on the minimum values of time between flashes achieves more efficient use of the various materials and components used by the invention. In general, the curves indicate the need for lower values of capacitors to create a corresponding increase in voltage.

It will be appreciated from the foregoing description of the invention that a safe, photoflash tube potential indicator suitable for use to test the energization of high voltage lines is provided by the invention. The invention can be permanently attached to a high voltage line and viewed from a distance or can be utilized by a lineman to manually test high voltage lines to determine whether or not they are safe to work on.

It will also be appreciated by those skilled in the art and others that the invention can be practiced otherwise than as specifically described herein. For example, the glow tube can be replaced by other devices which trigger when a sufficient voltage is reached. Moreover, other types of solid state switches than a triac can be used with the invention. In addition, the invention can be mounted in other types of housings than that specifically illustrated.

The embodiments of the invention in which an exclusive property or privilege is claimed are defined as follows:

1. A flash tube potential indicator suitable for indicating whether or not a high voltage line is energized, said flash tube potential indicator comprising:
   capacitive coupling means for coupling a high voltage line to an indicator circuit;
   an indicator circuit comprising:
     a rectifying means d.c.; to said capacitive coupling means for converting a.c. to d.c.
     capacitor storage means connected to said rectifying means for storing the d.c. energy;
     indicator means for providing a flash indication; and,
     trigger means connected between said capacitor storage means and said indicator means for triggering said indicator means to cause said flash indication when said capacitor storage means reaches a predetermined voltage level; and
   a housing for housing said capacitive coupling means and said indicator circuit so that said indicator means is viewable.

2. A flash tube potential indicator as claimed in claim 1 wherein said capacitive coupling means is formed of barium titanate.

3. A flash tube potential indicator as claimed in claim 1 wherein said rectifying means is a rectifying bridge formed of four diodes and said capacitor storage means is formed of first and second capacitors connected in series between opposite terminals of said diode bridge.

4. A flash tube potential indicator as claimed in claim 3 wherein said indicator means is a photoflash tube.

5. A flash tube potential indicator as claimed in claim 4 wherein said trigger means comprises:
   a triggerable element connected to the junction between said first and second capacitors;
   a switch connected to said triggerable element;
   a third capacitor connected at one end to said switch and the junction between said first and second capacitors; and,
   a transformer connected to the other end of said third capacitor and to said photoflash tube.

6. A flash tube potential indicator as claimed in claim 5 wherein said capacitive coupling means is formed of barium titanate.

7. A flash tube potential indicator as claimed in claim 6 wherein said barium titanate is formed in rods.

8. A flash tube potential indicator as claimed in claim 7 wherein said housing is cylindrical in shape and said barium titanate rods are mounted in one end and attached to a metallic tip, said housing also including a handle at its other end connected to said indicator circuit.

9. A flash tube potential indicator as claimed in claim 8 including attachment means for attaching the tip forming a portion of said housing to a high voltage line.

10. A flash tube potential indicator as claimed in claim 9 wherein said attachment means is a clamp.

* * * * *